United States Patent
Liao

(10) Patent No.: US 10,270,333 B2
(45) Date of Patent: Apr. 23, 2019

(54) POWER SUPPLY SYSTEM AND DISPLAY APPARATUS

(71) Applicant: Sitronix Technology Corp., Hsinchu County (TW)

(72) Inventor: Min-Nan Liao, Hsinchu County (TW)

(73) Assignee: Sitronix Technology Corp., Hsinchu County (TW)

( * ) Notice: Subject to any disclaimer, the term of this patent is extended or adjusted under 35 U.S.C. 154(b) by 231 days.

(21) Appl. No.: 14/825,191

(22) Filed: Aug. 13, 2015

(65) Prior Publication Data
US 2016/0359406 A1 Dec. 8, 2016

(30) Foreign Application Priority Data

Jun. 5, 2015 (TW) .............................. 104118273 A

(51) Int. Cl.
*G09G 3/36* (2006.01)
*H02M 1/36* (2007.01)
*H02M 3/07* (2006.01)

(52) U.S. Cl.
CPC ............ *H02M 3/07* (2013.01); *G09G 3/3688* (2013.01); *G09G 3/3696* (2013.01); *H02M 1/36* (2013.01); *G09G 2320/0252* (2013.01); *G09G 2330/021* (2013.01)

(58) Field of Classification Search
CPC ....... G05F 3/00; G05F 3/205; G09G 2330/00; G09G 2330/021; G09G 3/00; G09G 3/3688; G09G 3/3696; G11C 5/00; G11C 5/145; H02M 1/00; H02M 1/36; H02M 2003/00; H02M 2003/077; H02M 3/00; H02M 3/07; H02M 3/073

USPC .......................................................... 327/536
See application file for complete search history.

(56) References Cited

U.S. PATENT DOCUMENTS

2009/0079495 A1* 3/2009 Morita .................... H02M 3/07
327/538
2013/0271221 A1 10/2013 Levesque

FOREIGN PATENT DOCUMENTS

| CN | 101202022 A | 6/2008 |
| CN | 101727864 A | 6/2010 |
| CN | 101779374 A | 7/2010 |
| CN | 102361399 A | 2/2012 |
| CN | 103474018 A | 12/2013 |
| TW | 200627766 | 8/2006 |
| TW | 200803168 | 1/2008 |
| TW | 201108581 A1 | 3/2011 |
| TW | 201509092 A | 3/2015 |

* cited by examiner

*Primary Examiner* — Lincoln D Donovan
*Assistant Examiner* — Dave Mattison
(74) *Attorney, Agent, or Firm* — Winston Hsu

(57) ABSTRACT

A power supply system includes a control module for generating a control signal; a first charging pump module, coupled to the control module, for generating an adjustment charging value according to the control signal, and outputting a charging voltage according to the adjustment charging value and a conduction voltage source; an amplifying module, coupled to the first charging pump module, for utilizing the charging voltage to generate an amplifying voltage; and a load module, coupled to the amplifying module, for processing a dynamic charging operation according to the amplifying voltage.

9 Claims, 15 Drawing Sheets

POWER SUPPLY SYSTEM AND DISPLAY APPARATUS

BACKGROUND OF THE INVENTION

1. Field of the Invention

The present invention relates to a power supply system and a display apparatus, and more particularly, to a power supply system having an adjustment charging value for shortening a charging period while driving a display apparatus.

2. Description of the Prior Art

During portable electronic devices rapidly developing, thinner products with energy saving and carbon reduction are much more popular in the market, and higher resolutions of a thin film transistor (TFT) liquid crystal display (LCD) is requested as well, wherein the TFT LCD having higher resolutions are equipped with more driving units for related driving operations. Due to a fixed operational period of the TFT LCD for finishing the driving operations, one TFT LCD having more driving units requests a driving period being shorter than another driving period requested by another TFT LCD having fewer driving units. Accordingly, it is an important issue to realize the circuit design with such a shorter driving period.

Besides, flexible printed circuit boards (PCBs) in the TFT LCD are installed multiple passive elements, e.g. capacitors or diodes. For the purpose of pursuing thinner and lighter products to effectively reduce the size of the flexible PCBs, these passive elements are designed to be disposed/moved inside a driving chip of the TFT LCD, and a load module corresponding to the driving chip is demonstrated as a resistor-capacitor model shown in FIG. 1A. When the load module forms as a gate type, a capacitance value is around 20 pF; when the load module forms as a source type, a capacitance value is around 30-60 pF, wherein both types of the load modules with different capacitance values correspond to a load charging period shown in FIG. 1B.

Please refer to FIG. 2A and FIG. 2B, wherein FIG. 2A illustrates a schematic diagram of a conventional two-times-voltage charging pump power supply system 2, and FIG. 2B is a schematic diagram of a charging pump module 20 in FIG. 2A. As shown in FIG. 2A and FIG. 2B, the two-times-voltage charging pump power supply system 2 comprises a charging pump module 20, an amplifying module 22 and a load module 23 (such as an equivalent load circuit of a display panel), and the charging pump module 20 comprises transistor switches M1-M8, flying capacitor units C1 and C2 and a storage capacitor unit Cs. Preferably, the charging pump module 20 utilizes conduction signals KA, KB, XA (an inversion signal of KA) and XB (an inversion signal of KB) to correspondingly conduct the transistor switches M1-M8 and utilizes a voltage VDD for charging the flying capacitor units C1 and C2, so as to output a charging voltage VS. Further, the amplifying module 22 is operated to refer to a reference voltage Vref and to amplify a voltage source, such as the charging voltage VS, to be outputted as an amplifying voltage Vout, and the amplifying voltage Vout is transmitted to the load module 24 (e.g. a display panel) to process the charging operation for the equivalent resistor-capacitor circuit.

Please refer to FIG. 2C, which illustrates a schematic diagram of a charging period of a charging pump module 20 shown in FIG. 2A. As shown in FIG. 2C, the charging pump module 20 has a regular charging period Ts and a practical charging period Tr, and the practical charging period Tr is longer than the regular charging period Ts. In other words, while the charging pump module 20 is utilized to drive the TFT LCD, a longer operational period is anticipated, such that it is difficult to provide proper circuit designs for complying with different specs of the TFT LCD.

Therefore, it has become an important issue to provide another circuit design for the conventional charging pump module, so as to make the charging pump module achieve a predetermined charging voltage within a shorter period.

SUMMARY OF THE INVENTION

Therefore, the primary objective of the present invention is to provide another modified circuit design for the charging pump module, so as to make the charging pump module achieve a predetermined charging voltage within a shorter period.

The present invention discloses power supply system. The power supply system comprises a control module for generating a control signal; a first charging pump module, coupled to the control module, for generating an adjustment charging value according to the control signal, and outputting a charging voltage according to the adjustment charging value and a conduction voltage source; an amplifying module, coupled to the first charging pump module, for utilizing the charging voltage as a voltage source to generate an amplifying voltage; and a load module, coupled to the amplifying module, for processing a dynamic charging operation according to the amplifying voltage.

The present invention further discloses a display apparatus. The display apparatus comprises a display panel; and a power supply system, coupled to the display panel. The power supply system comprises a control module for generating a control signal; a first charging pump module, coupled to the control module, for generating an adjustment charging value according to the control signal, and outputting a charging voltage according to the adjustment charging value and a conduction voltage source; an amplifying module, coupled to the first charging pump module, for utilizing the charging voltage as a voltage source to generate an amplifying voltage; and a load module, coupled to the amplifying module, for processing a dynamic charging operation according to the amplifying voltage, to drive a display operation of the display panel.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in sub-module. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1A:
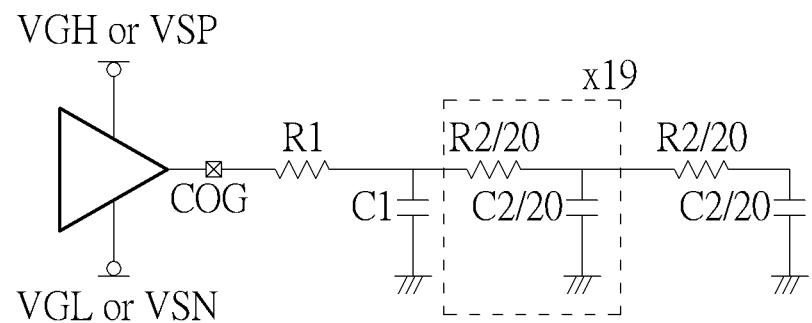
FIG. 1A illustrates a schematic diagram of a conventional load module corresponding to a driving chip.
Figure 1B:
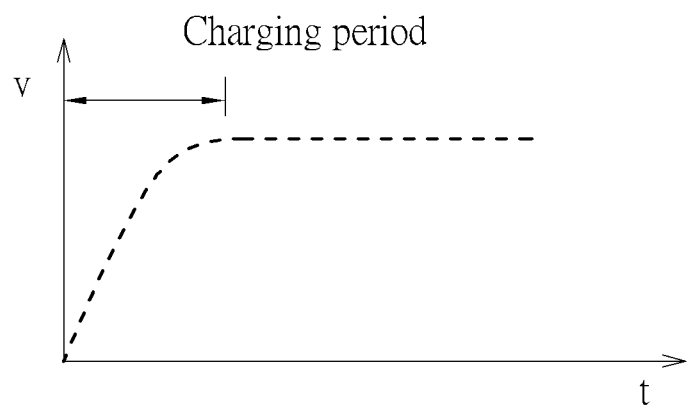
FIG. 1B illustrates a schematic diagram of a load charging period corresponding to a load module shown in FIG. 1A.
Figure 2A:
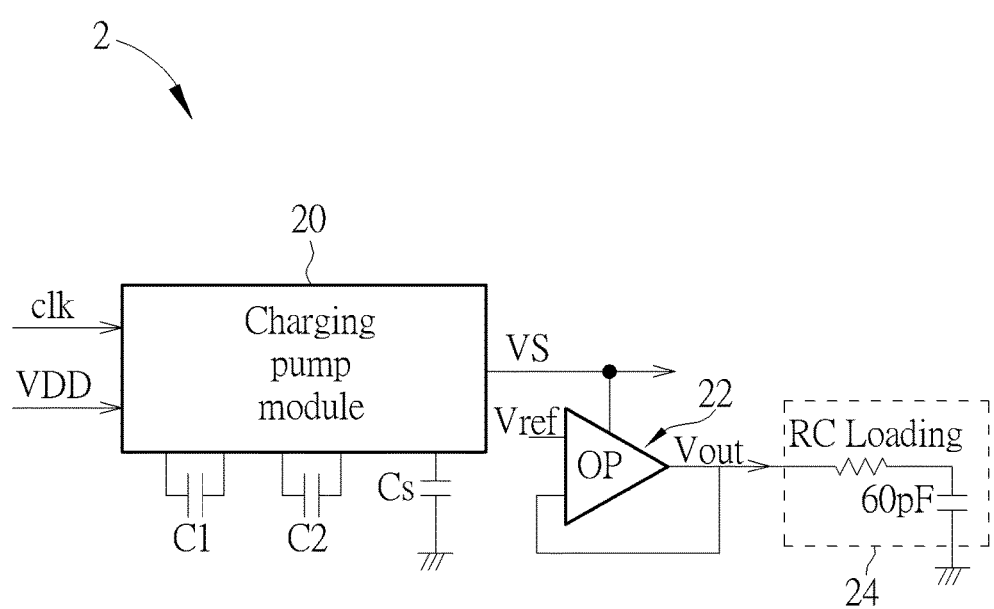
FIG. 2A illustrates a schematic diagram of a conventional two-times-voltage charging pump power supply system.
Figure 2B:
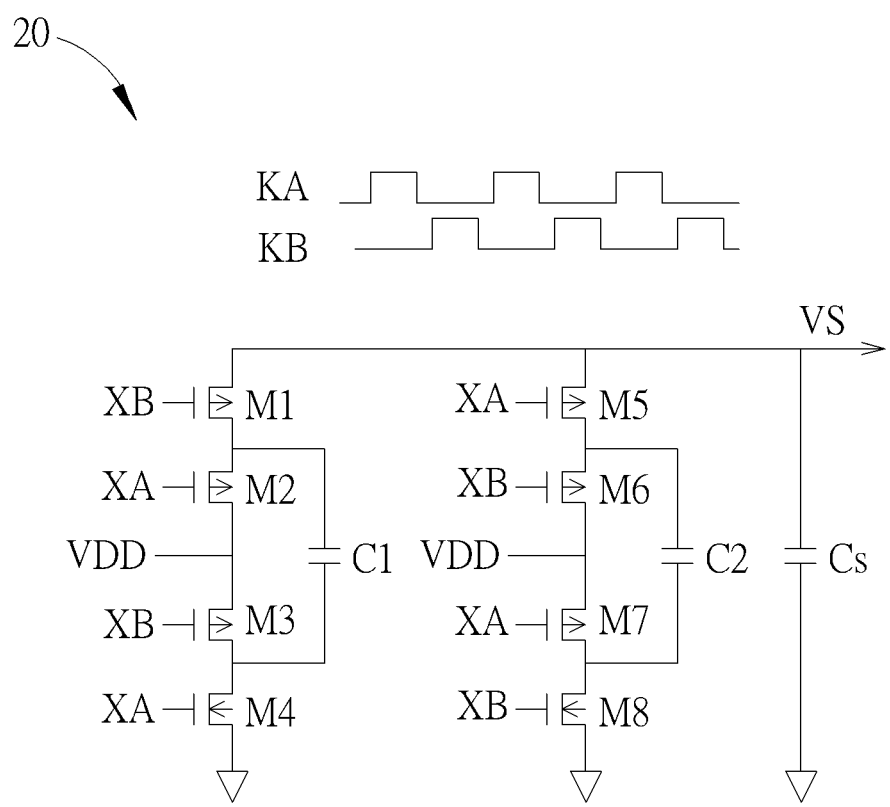
FIG. 2B is a schematic diagram of a charging pump module in FIG. 2A.
Figure 2C:
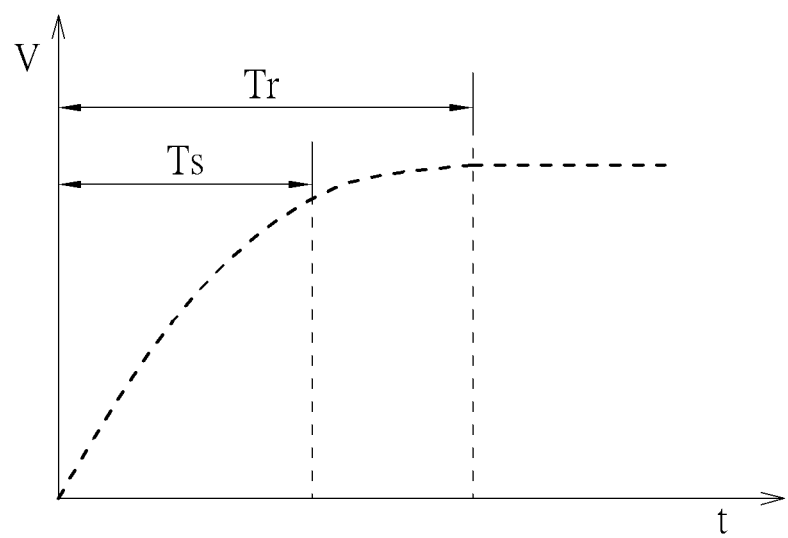
FIG. 2C is a schematic diagram of a charging period of a charging pump module in FIG. 2A.
Figure 3A:
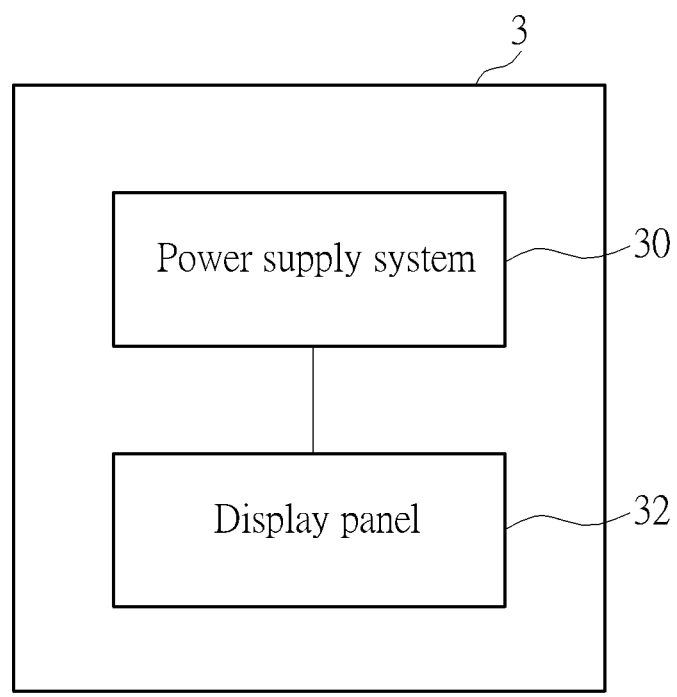
FIG. 3A illustrates a schematic diagram of a display apparatus according to an embodiment of the invention.
Figure 3B:
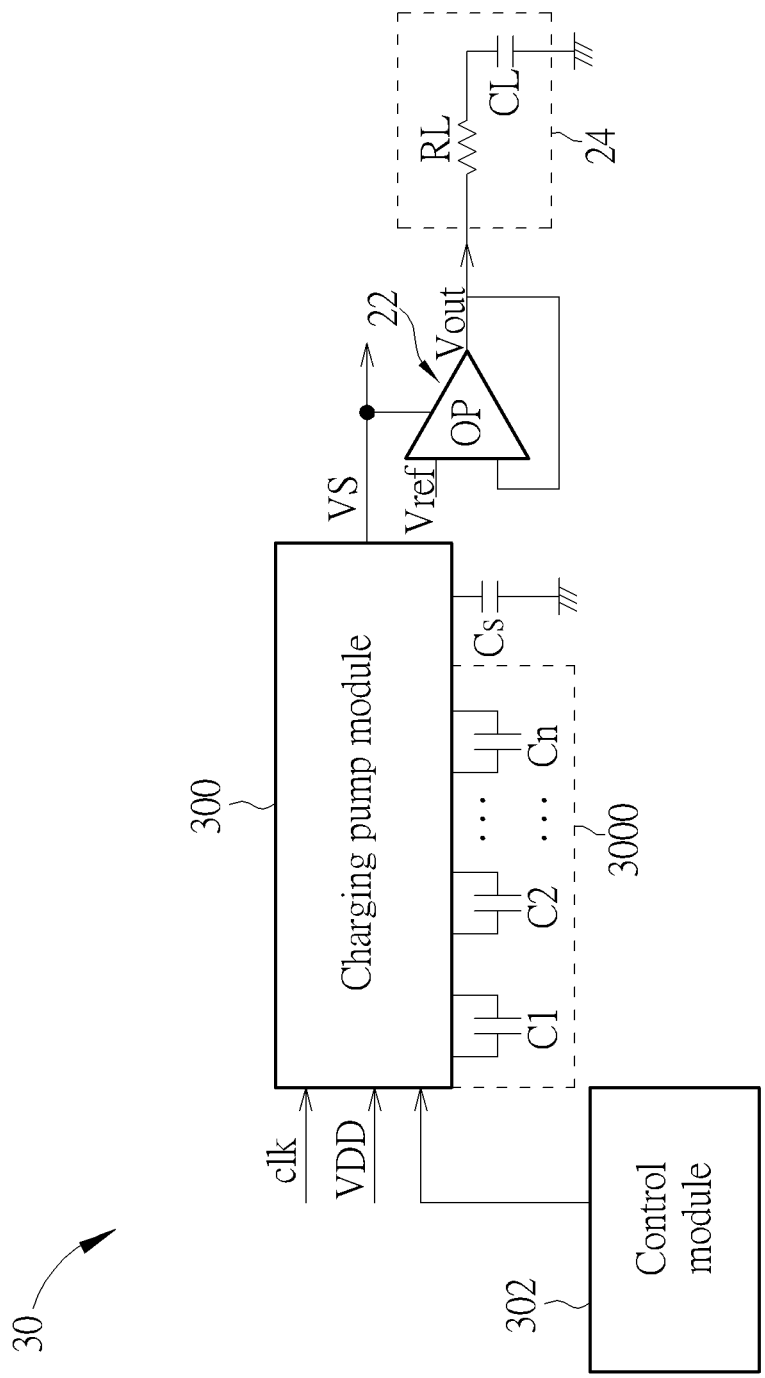
FIG. 3B illustrates a schematic diagram of a power supply system according to an embodiment of the invention.

Please refer to FIG. 3A and FIG. 3B, wherein FIG. 3A illustrates a schematic diagram of a display apparatus 3 according to an embodiment of the invention, and FIG. 3B illustrates a schematic diagram of a power supply system 30 according to an embodiment of the invention. As shown in FIG. 3A and FIG. 3B, the display apparatus 3 of the embodiment comprises a power supply system 30 and a display panel 32, and the power supply system 30 is coupled to the display panel 32, to provide a driving voltage for driving the display panel 32 for a display operation. Besides, the power supply system 30 is similar to the two-times-voltage charging pump power supply system 2 shown in FIG. 2B, and comprises a charging pump module 300 and the amplifying module 22. The charging pump module 300 of the embodiment is further coupled to a control module 302 and comprises a plurality of flying capacitor units C1-Cn for forming a flying capacitor module 3000. The power supply system 30 is also coupled to an equivalent load circuit, such as the load module 24, corresponding to the display panel 32, wherein the load module 24 comprises a load resistor RL and a load capacitor CL, and the load resistor RL is coupled to the load capacitor CL in series and a terminal of the load capacitor CL is coupled to the ground.

Accordingly, the control module 302 of the embodiment can generate at least one control signal to be transmitted to the flying capacitor module 3000, so as to control a conduction way of the flying capacitor units C1-Cn, such that the charging pump module 300 can adaptively generate an adjustment charging value. In the meanwhile, the charging pump module 300 receives a conduction voltage source VDD and a clock signal clk. Under such circumstances, the charging pump module 300 can utilize the adjustment charging value to elevate the conduction voltage source VDD to be a charging voltage VS, so as to transmit the charging voltage VS to the amplifying module 22. Besides, an input terminal of the amplifying module 22 can receive the charging voltage VS and a reference voltage Vref, wherein the charging voltage VS is as a voltage source. Also, an output terminal of the amplifying module 22 feedbacks a voltage value to another input terminal of the amplifying module 22, such that the amplifying module 22 can process an amplifying operation according to a comparison result between the feedback voltage value and the reference voltage Vref, to output an amplifying voltage Vout to the load module 24. The load resistor RL and the load capacitor CL in the load module can process a dynamic charging operation according to the amplifying voltage Vout, to drive the display panel 32 for the related operations.

In other words, during the dynamic charging operation, the embodiment of the invention utilizes the control module 302 to control the conduction way of the flying capacitor units C1-Cn, so as to generate different connection relationships among the flying capacitor units C1-Cn, such that the charging pump module 300 can generate different values of the adjustment charging value, i.e. different connection relationships of the flying capacitor units correspond to different values of the adjustment charging value. Accordingly, the charging pump module 300 of the embodiment can dynamically generate different values of the charging voltage VS, to provide different charging voltage values corresponding to different charging capabilities to the load module 24, such that the load module 24 can be charged to achieve the predetermined voltage within a predetermined period, so as to solve the issue that a longer charging period is needed for the conventional charging pump module.

Figure 4:
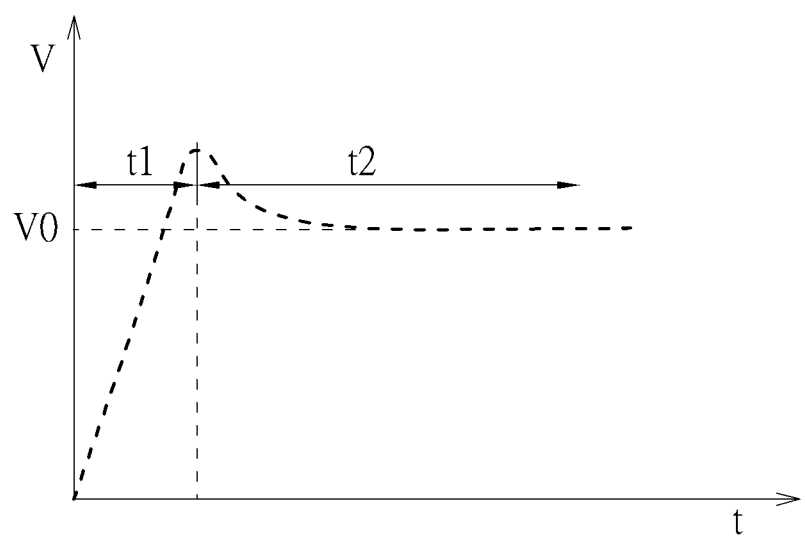
FIG. 4 illustrates a schematic diagram of a power supply system processing a dynamic charging operation according to an embodiment of the invention.

Please refer to FIG. 4, which illustrates a schematic diagram of a power supply system 30 processing a dynamic charging operation according to an embodiment of the invention. As shown in FIG. 4, when the power supply system 30 of the embodiment is operated in a first period t1, the charging pump module 300 can correspondingly output a larger value of the adjustment charging value for shortening the charging period of the load module 24 since the voltage value corresponding to the load module 24 is still zero. For example, the charging pump module 300 can output 3 times of the adjustment charging value to provide a stronger charging capability to the load module 24 for processing the charging operation thereof. When the power supply system 30 is operated in a second period t2, i.e. the voltage value corresponding to the load module 24 exceeds a predetermined voltage V0 to be large enough to drive the display panel 32, the charging pump module 300 can correspondingly output a smaller value of the adjustment charging value, e.g. 2 times, to have the charging pump module 300 be operated in a normal operation status.

In other words, the dynamic charging operation of the embodiment can correspondingly output an initiation adjustment charging value while the amplifying voltage Vout is smaller than the predetermined voltage V0; when the amplifying voltage Vout is larger than the predetermined voltage V0, the dynamic charging operation can correspondingly output a termination adjustment charging value, wherein the initiation adjustment charging value is larger than the termination adjustment charging value. Besides, the charging pump module 300 of the embodiment is operated to adjust the value of the adjustment charging value within two periods, i.e. from the initiation adjustment charging value to the termination adjustment charging value, such that the load module 24 can be charged to achieve the predetermined voltage V0 in a shortest period. Certainly, those skilled in the art can adaptively modify the value of the adjustment charging value according to different requirements, to have the value of the adjustment charging value be gradually adjusted in multiple periods or in a stairway adjustment, so as to finish the dynamic charging operation of the load module 24. Under such circumstances, the power supply system 30 does not need to consume more power, and can generate the predetermined voltage V0 within a shortest period for driving the display apparatus, which is also within the scope of the invention.

Figure 5:
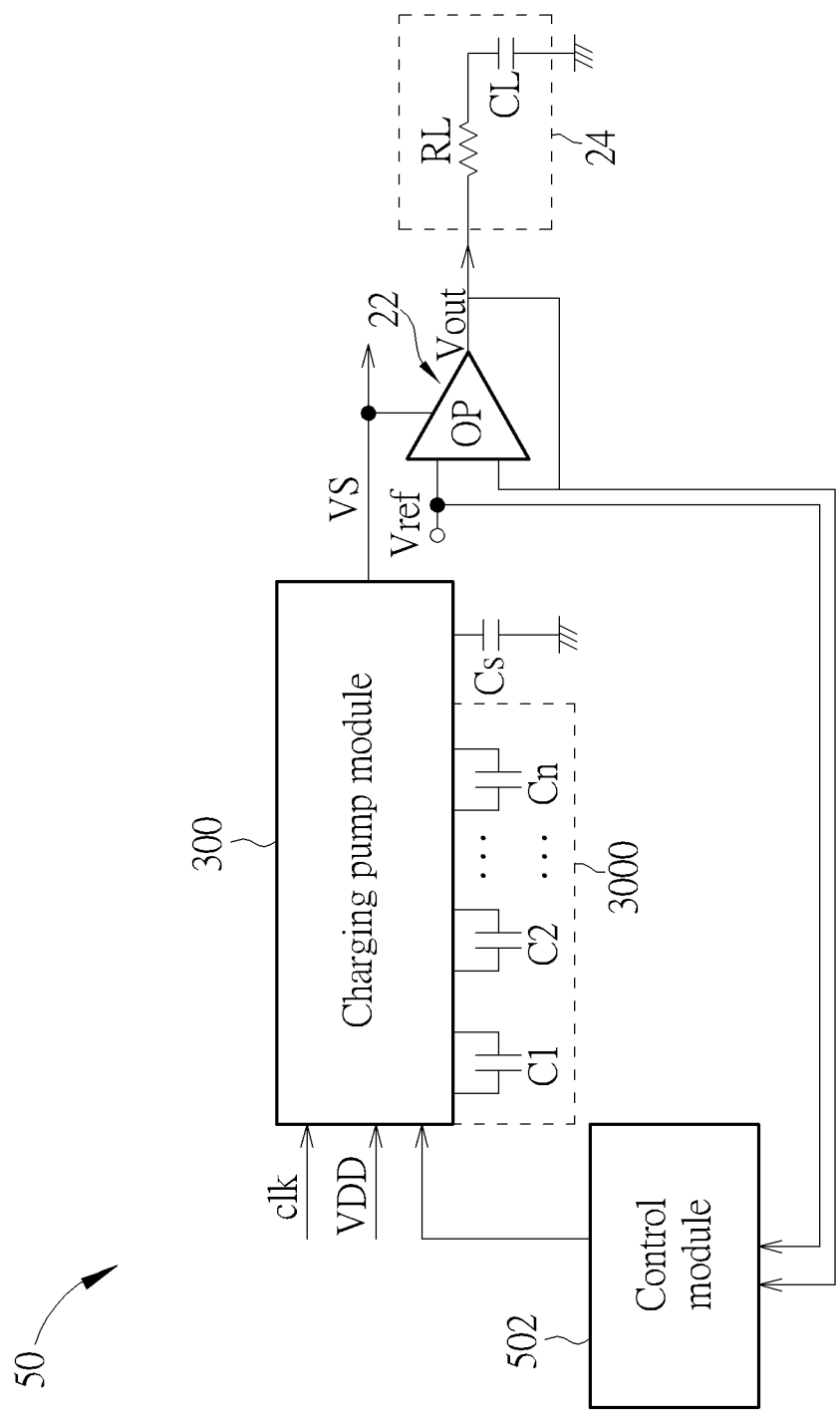
FIG. 5 illustrates a schematic diagram of another power supply system according to an embodiment of the invention.

Please refer to FIG. 5, which illustrates a schematic diagram of another power supply system 50 according to an embodiment of the invention. Being similar to the power supply system 30 shown in FIG. 3B, the power supply system 50 in FIG. 5 also comprises the charging pump module 300, the amplifying module 22 and the load module 24 being sequentially connected in series. The charging pump module 300 comprises the flying capacitor module 3000 and the flying capacitor units C1-Cn thereof, and the load module 24 comprises the load resistor RL and the load capacitor CL. The only difference is that the charging pump module 300 is further coupled to a control module 502. The control module 502 is realized as an analog controller to be coupled to the amplifying module 22 for receiving a difference between the reference voltage Vref and the amplifying voltage Vout, so as to correspondingly output at least one control signal for turning on or turning off the flying capacitor units C1-Cn, such that the charging pump module 300 can adaptively generate different values of the adjustment charging value.

In other words, while operating the dynamic charging operation, the embodiment of the invention can utilize the control module 502 to adaptively monitor whether the current amplifying voltage has achieved the predetermined voltage V0 (i.e. comparing the difference between the reference voltage Vref and the amplifying voltage Vout), so as to correspondingly turn on or turn off the flying capacitor units C1-Cn for generating different connection relationships of the flying capacitor units C1-Cn, such that the charging pump module 300 can generate different values of the adjustment charging value to provide different charging capabilities to the load module 24, so as to have the load module 24 be charged to the predetermined voltage V0 within the predetermined period and to solve the issue that a longer charging period is needed for the conventional charging pump module.

Figure 6:
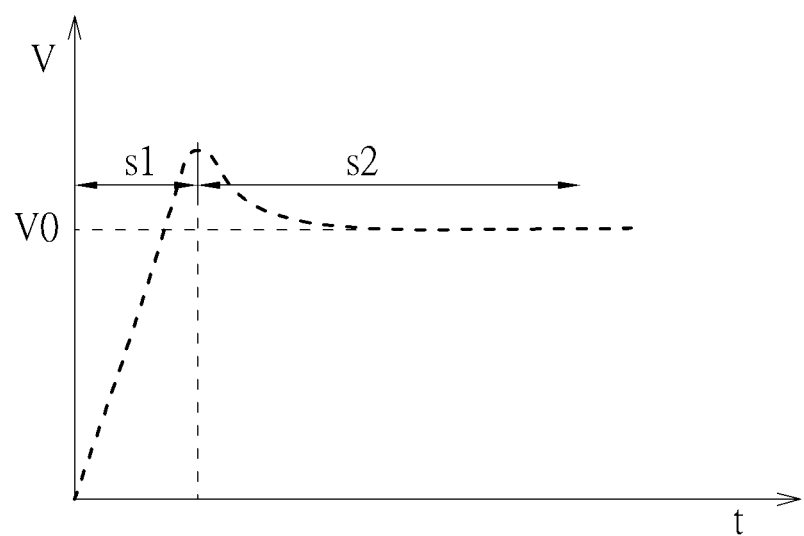
FIG. 6 illustrates a schematic diagram of a power supply system shown in FIG. 5 to process a dynamic charging operation.

Please refer to FIG. 6, which illustrates a schematic diagram of a power supply system 50 shown in FIG. 5 to process a dynamic charging operation. Being similar to the dynamic charging operation in FIG. 4, the power supply system 50 in FIG. 6 is at least operated in a first period s1 and a second period s2, and the control module 502 can adaptively monitor the amplifying voltage Vout, to correspondingly output the control signal at different periods for modifying or changing the connection relationships of the flying capacitor units C1-Cn, so as to make the charging pump module 300 generate different values of the adjustment charging value, such that the load module 24 can be charged to the predetermined voltage V0 in a shortest period. For example, in the first period s1, the charging pump module 300 can correspondingly output the adjustment charging value with a larger value, such as 3 times, to provide a stronger charging capability for charging the load module 24. In the second period s2, the charging pump module 300 can correspondingly output the adjustment charging value with a smaller value, such as 2 times, to have the charging pump module 300 be operated in the normal operational status.

Accordingly, the charging pump module 300 of the power supply system 50 in the embodiment can utilize the control module 502 to simultaneously monitor the changes of the amplifying voltage Vout, and can adaptively adjust the values of the adjustment charging value within the two periods, so as to have the load module 24 be charged to the predetermined voltage V0 within the shortest period. Certainly, those skilled in the art can adaptively modify the value of the adjustment charging value outputted by the charging pump module 300 according to different requirements, to have the value of the adjustment charging value be gradually adjusted in multiple periods or in a stairway adjustment, so as to finish the dynamic charging operation of the load module 24. Under such circumstances, the power supply system 50 does not need to consume more power, and can generate the predetermined voltage V0 within a shortest period for driving the display apparatus, which is also within the scope of the invention.

Figure 7:
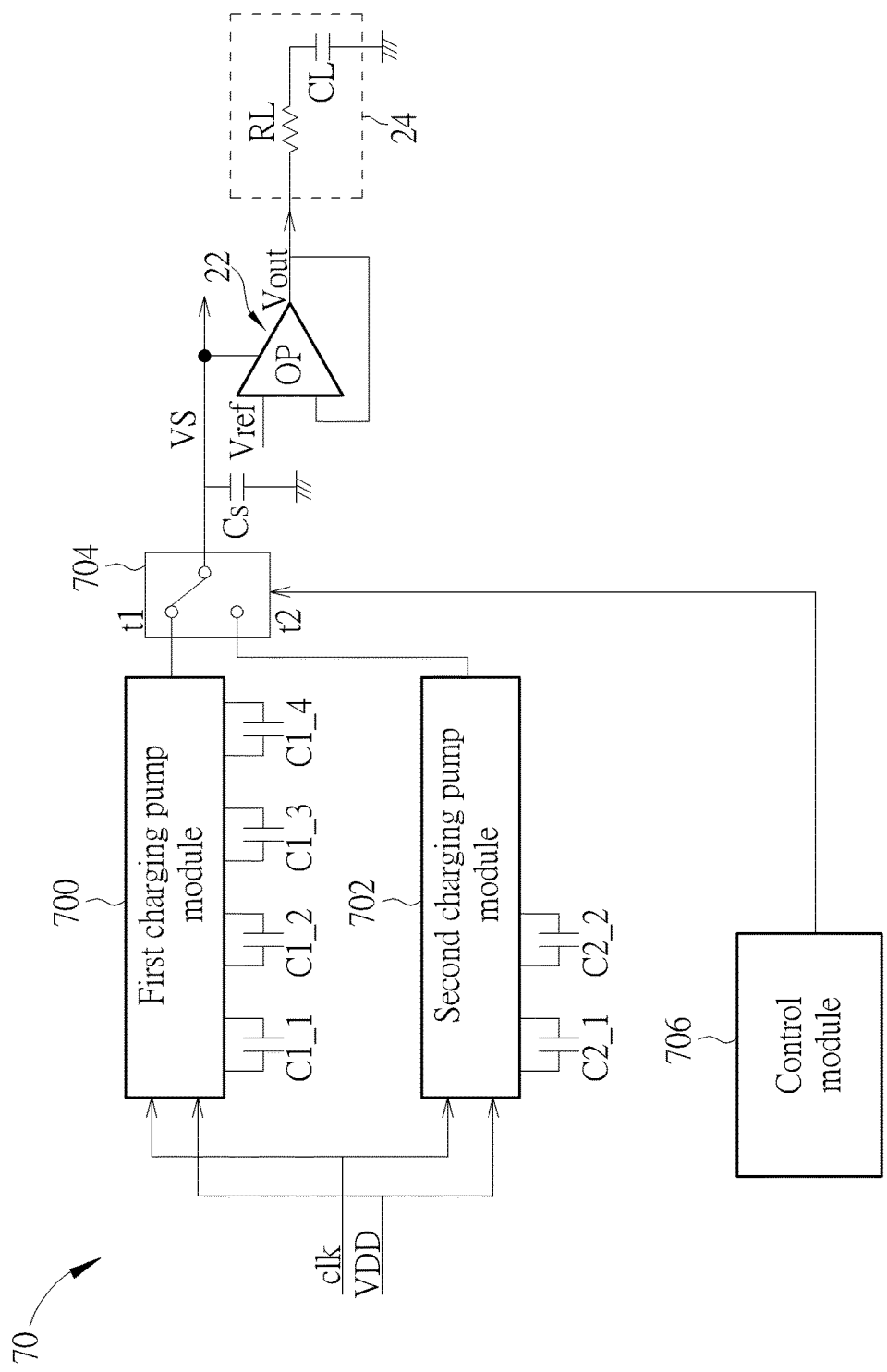
FIG. 7 illustrates a schematic diagram of another power supply system according to an embodiment of the invention.

Please refer to FIG. 7, which illustrates a schematic diagram of another power supply system 70 according to an embodiment of the invention. As shown in FIG. 7, the power supply system 70 of the embodiment comprises a first charging pump module 700, a second charging pump module 702, a switch module 704, a control module 706, the amplifying module 22 and the load module 24. Preferably, operations of the charging pump modules 700 and 702 are similar to the operations of the charging pump module 300 shown in FIG. 3B. The difference is that the first charging pump module 700 of the embodiment comprises the flying capacitor units C1_1-C1_4 having a first adjustment charging value (e.g. 3 times), and the second charging pump module 702 of the embodiment comprises the flying capacitor units C2_1-C2_2 having a second adjustment charging value (e.g. 2 times). Besides, the charging pump modules 700 and 702 are coupled to the switch module 704, and the switch module 704 is coupled to the control module 706, the amplifying module 22 and a storage capacitor unit Cs. Accordingly, the switch module 704 is operated to receive the control signal from the control module 706 for correspondingly switching the connection of the charging pump modules 700 and 702, so as to adaptively choose either one of the first adjustment charging value of the first charging pump module 700 and the second adjustment charging value of the second charging pump modules 702, such that the amplifying module 22 can correspondingly receive the charging voltage outputted by the first charging pump module 700 or the second charging pump module 702 (i.e. one has the stronger charging capability and the other has the charging capability for operating in the normal operational status). The operations of the amplifying module 22 and the load module 24 can refer to the embodiment shown in FIG. 3B, and are not described herein for brevity.

In other words, in the dynamic charging operation, the switch module 704 can utilize the control signal to adaptively conduct the first charging pump module 700 or the second charging pump module 702 to be coupled to the amplifying module 22, so as to utilize different values of the adjustment charging value. Certainly, those skilled in the art can operate the charging pump modules 700 and 702 to have the same operation as the charging pump module 300 shown in FIG. 3B, i.e. the first charging pump module 700 (or the second charging pump module 702) is further coupled to another control module (or sharing the control module 706 of the embodiment) to adaptively conduct the flying capacitor units thereof for obtaining different connection relationships of the flying capacitor units with different values of the adjustment charging value (i.e. the first adjustment charging value or the second adjustment charging value is a adjustable value with different modifications rather than a fixed value). Further, according to different charging conditions, the switch module 704 can correspondingly conduct the first charging pump module 700 or the second charging pump module 702, such that the first charging pump module 700 and the second charging pump module 702 having different values of the adjustment charging value can be sequentially operated to process the dynamic charging operation. For example, the first charging pump module 700 is responsible to output a larger value of the adjustment charging value and the second charging pump module 702 is responsible to output a smaller value of the adjustment charging value, such that the operational period of the first/second charging pump module can be adaptively adjusted to achieve the predetermined voltage V0 with the minimum power and the shortest period, which is also within the scope of the invention. The timing diagram of the dynamic charging operation for the power supply system 70 can refer to the embodiment in FIG. 4, which is not described herein for brevity.

Figure 8A:
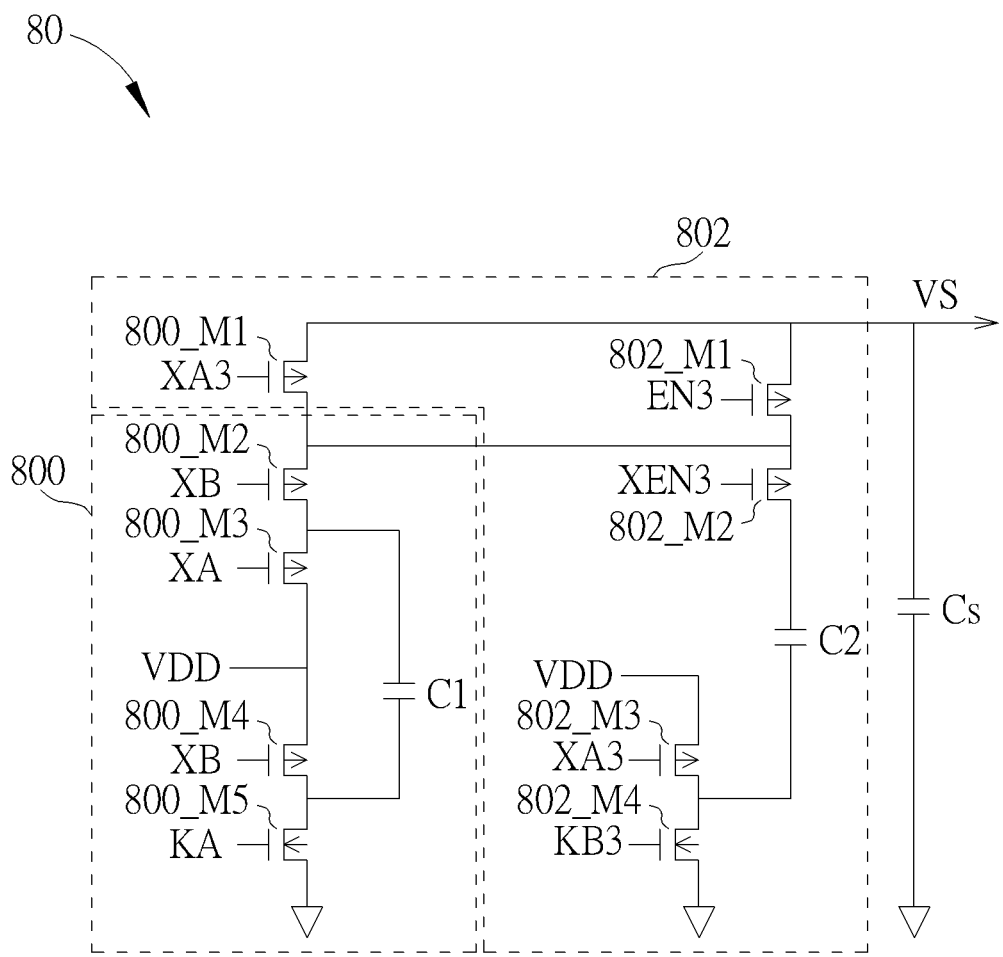
FIG. 8A illustrates a schematic diagram of a detailed circuit of a charging pump module 80 according to an embodiment of the invention.
Figure 8B:
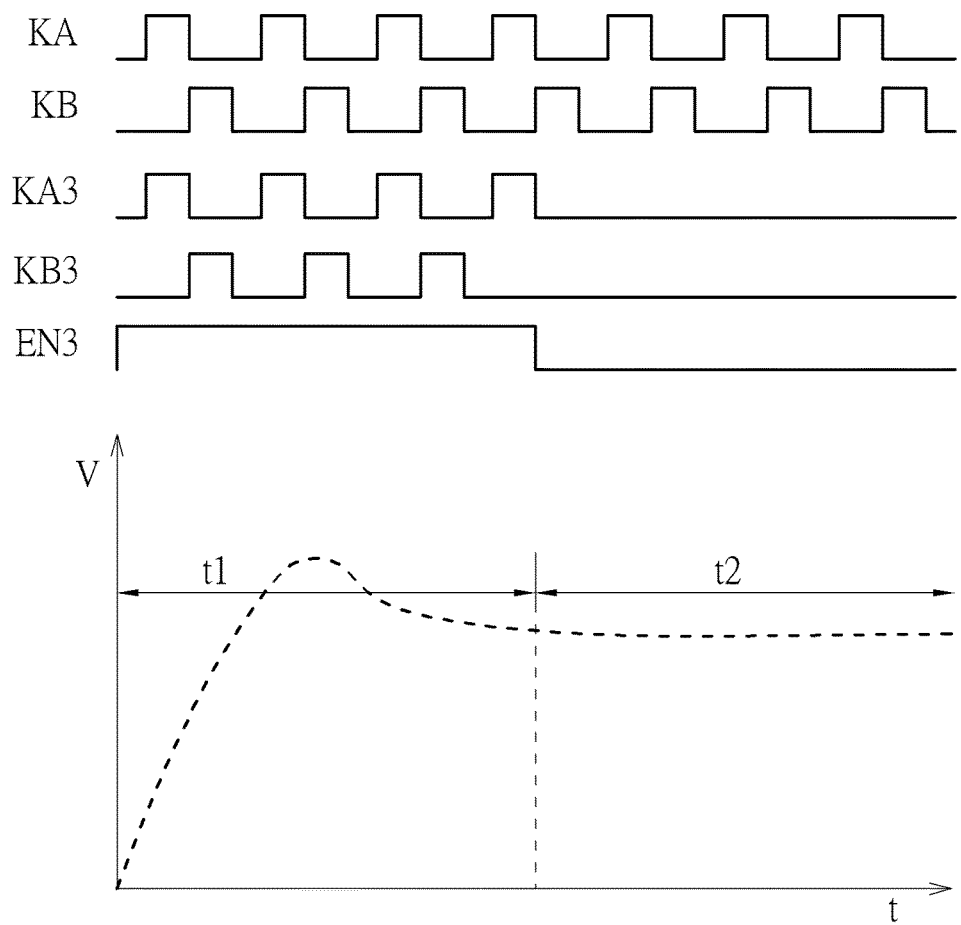
FIG. 8B illustrates a schematic diagram of control signals and operational timings of a charging pump module shown in FIG. 8A.

Please refer to FIG. 8A and FIG. 8B, FIG. 8A illustrates a schematic diagram of a detailed circuit of a charging pump module 80 according to an embodiment of the invention, and FIG. 8B illustrates a schematic diagram of control signals and operational timings of a charging pump module 80 shown in FIG. 8A. As shown in FIG. 8A and FIG. 8B, the charging pump module 80 comprises a first charging pump circuit 800, a second charging pump circuit 802 and a storage capacitor unit Cs to be coupled together in parallel. Preferably, the first charging pump circuit 800 comprises transistor switches 800_M2-800_M5 to be coupled together in series, and the transistor switches 800_M2-800_M5 are coupled to a flying capacitor unit C1 in parallel. In other words, drains of the transistor switches 800_M2, 800_M3 are coupled to sources of the transistor switches 800_M3, 800_M4, a drain of the transistor switch 800_M4 is coupled to a drain of the transistor switch 800_M5, a source of transistor switch 800_M5 is coupled to a ground, a drain of transistor switch 800_M2 and a source of transistor switch 800_M3 are coupled to a terminal of flying capacitor unit C1, the drain of the transistor switch 800_M4 and the drain of the transistor switch 800_M5 are coupled to another terminal of the flying capacitor unit C1, and the drain of the transistor switch 800_M3 and the source of the transistor switch 800_M4 are connected together to receive a conduction voltage source VDD.

Additionally, the second charging pump circuit 802 comprises transistor switches 800_M1, 802_M1-802_M4 and a flying capacitor unit C2, wherein the transistor switches 802_M1 and 802_M2 and the flying capacitor unit C2 are connected in series to form a first circuit branch, i.e. a drain of the transistor switch 802_M1 is coupled to a source of the transistor switch 802_M2, a drain of the transistor switch 802_M2 is coupled to a terminal of the flying capacitor unit C2. The transistor switch 802_M3 is formed as a second circuit branch, i.e. a source of the transistor switch 802_M3 is coupled to a conduction voltage source VDD. Accordingly, the first circuit branch and the second circuit branch are connected in parallel to a drain of the transistor switch 802_M4, i.e. another terminal of the flying capacitor unit C2, a drain of the transistor switch 802_M3, and the drain of the transistor switch 802_M4 are connected together, and a source of the transistor switch 802_M4 is coupled to the ground. Besides, the source of the transistor switch 800_M1, the source of the transistor switch 802_M1 and a terminal of the storage capacitor unit Cs are connected together, and the drain of the transistor switch 800_M1 and the drain of the transistor switch 802_M1 are connected together as well. A drain of the transistor switches 800_M1 is coupled to the source of the transistor switches 800_M2.

Moreover, in the embodiment, the charging pump module 80 can utilize the conduction signals KA, KB, XA, XB, KA3, KB3, XA3 (i.e. an inversion signal of KA3), XB3 (i.e. an inversion signal of KB3), EN3, XEN3 (i.e. an inversion signal of EN3), to adaptively conduct the transistor switches 800_M1-800_M5, 802_M1-802_M4, i.e. gates of the 800_M1, 800_M2, 800_M3, 800_M4, 800_M5, 802_M1, 802_M2, 802_M3, 802_M4 receive the conduction signals XA3, XB, XA, XB, KA, EN3, XEN3, XA3, KB3, respectively. Accordingly, the charging pump module 80 can conduct the flying capacitor units C1, C2, respectively, in the operational periods t1, t2 according to the waveforms of the conduction signals shown in FIG. 8B, to output different values of the adjustment charging value, e.g. the charging pump module 80 can selectively output the adjustment charging value as 2 times or 3 times. For example, the flying capacitor unit C1 is serially connected to the flying capacitor unit C2 when a first voltage boost factor (3 times) is selected, the flying capacitor unit C2 is disconnected from the flying capacitor unit C1 when a second voltage boost factor (2 times) is selected.

Figure 9A:
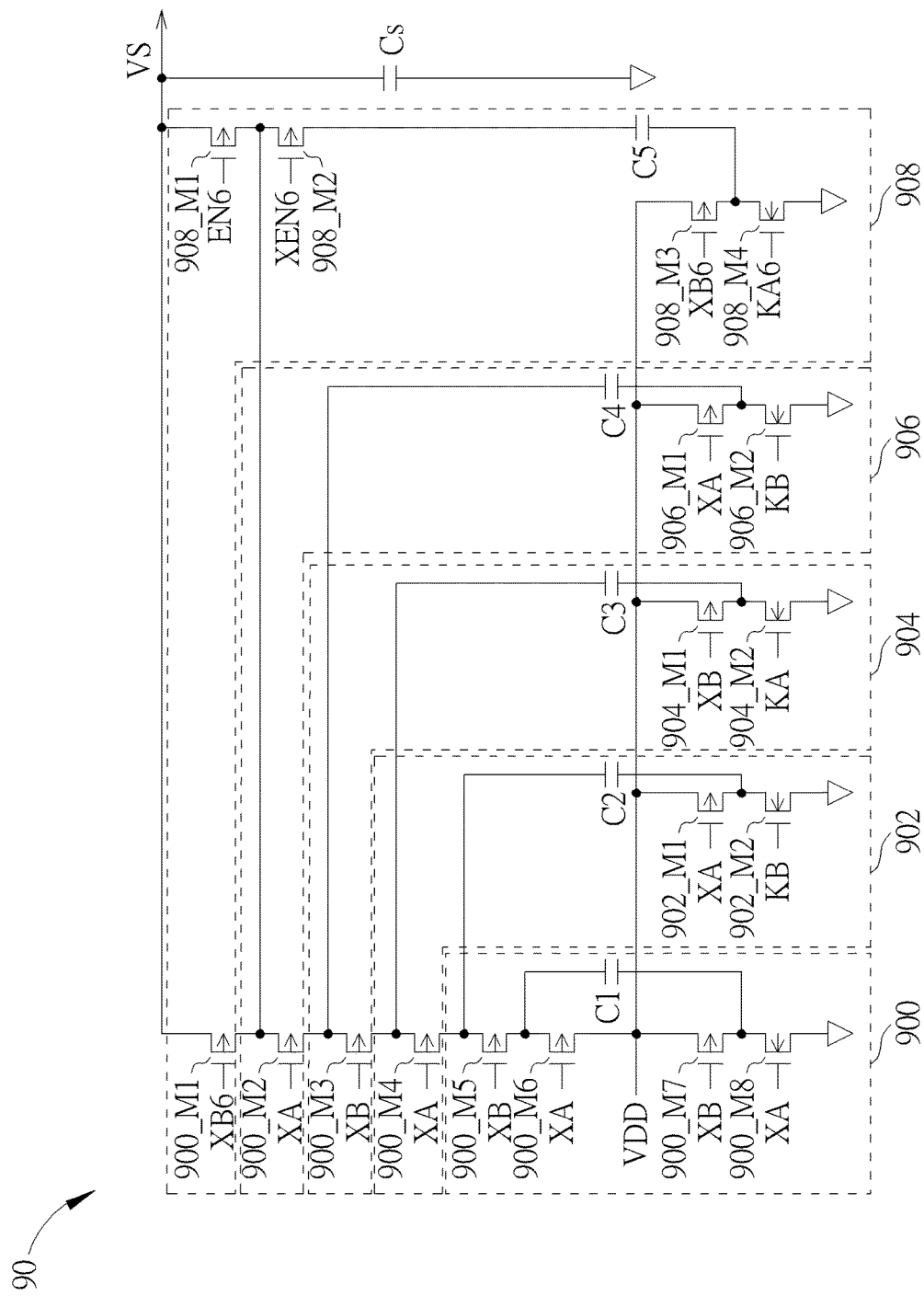
FIG. 9A illustrates a schematic diagram of a detailed circuit of a charging pump module according to an embodiment of the invention.
Figure 9B:
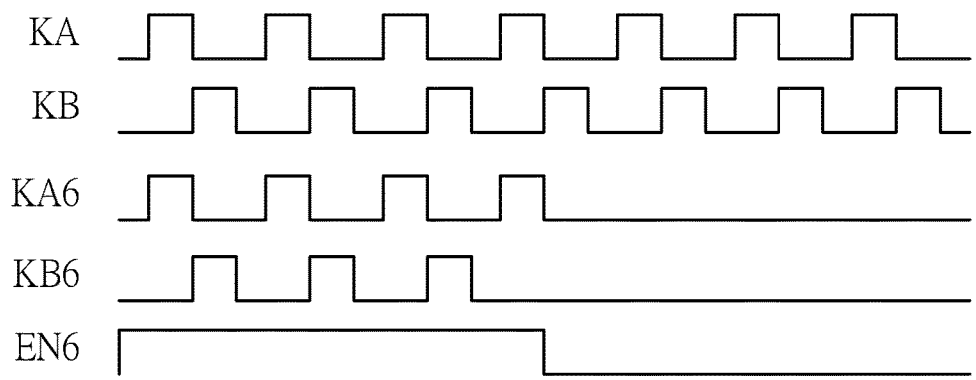
FIG. 9B illustrates a schematic diagram of control signals and operational timings of a charging pump module shown in FIG. 9A.
Figure 9B:
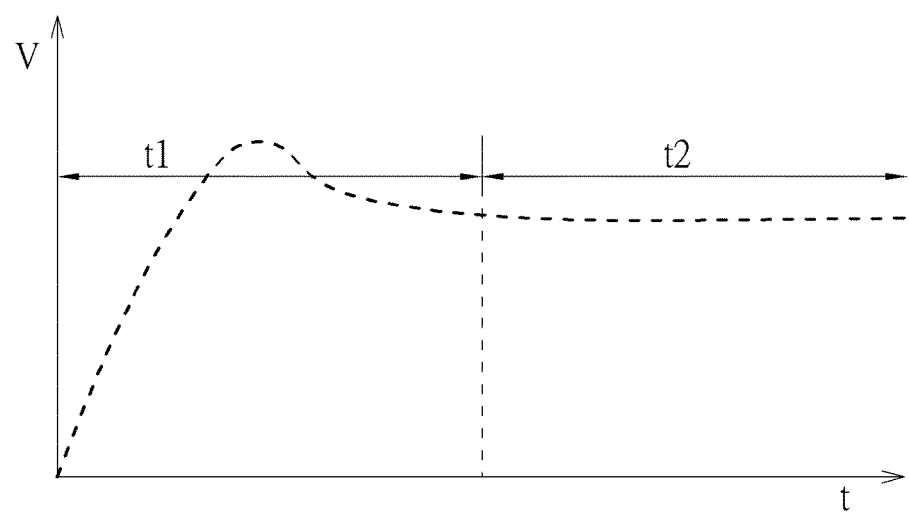

Please refer to FIGS. 9A and 9B, FIG. 9A illustrates a schematic diagram of a detailed circuit of a charging pump module 90 according to an embodiment of the invention, and FIG. 9B illustrates a schematic diagram of control signals and operational timings of a charging pump module 90 shown in FIG. 9A. As shown in FIG. 9A and FIG. 9B, the charging pump module 90 comprises a first charging pump circuit 900, a second charging pump circuit 902, a third charging pump circuit 904, a fourth charging pump circuit 906, a fifth charging pump circuit 908 and a storage capacitor unit Cs to be connected together in parallel. Preferably, the first charging pump circuit 900 comprises transistor switches 900_M5-900_M8 to be connected together in series, i.e. drains of the transistor switches 900_M5, 900_M6 are coupled to sources of the transistor switches 900_M6, 900_M7, respectively, a drain of the transistor switch 900_M7 is coupled to a drain of the transistor switch 900_M8, a source of transistor switch 900_M8 is coupled to a ground, a drain of transistor switch 900_M5 and a source of transistor switch 900_M6 are coupled to a terminal of flying capacitor unit C1, the drain of the transistor switch 900_M7 and the drain of the transistor switch 900_M8 are coupled to another terminal of the flying capacitor unit C1, and the drain of the transistor switch 900_M6 and the source of the transistor switch 900_M7 are connected together to receive a conduction voltage source VDD.

Besides, the second charging pump circuit 902 comprises transistor switches 900_M4, 902_M1-902_M2 and a flying capacitor unit C2, wherein a source of the transistor switch 902_M1 receives the conduction voltage source VDD, a terminal of the flying capacitor unit C2 is coupled to the drain of the transistor switch 900_M4 and the source of the transistor switch 900_M5, another terminal of the flying capacitor unit C2 is coupled to a drain of the transistor switch 902_M1 and a drain of the transistor switch 902_M2, and a source of the transistor switch 902_M2 is coupled to the ground. The third charging pump circuit 904 comprises transistor switches 900_M3, 904_M1, 904_M2 and a flying capacitor unit C3, wherein a source of the transistor switch 904_M1 receives the conduction voltage source VDD, a terminal of flying capacitor unit C3 is coupled to the drain of transistor switch 900_M3 and the source of the transistor switch 900_M4, another terminal of the flying capacitor unit C3 is coupled to a drain of the transistor switch 904_M1 and a drain of the transistor switch 904_M2, and a source of the transistor switch 904_M2 is coupled to the ground. The fourth charging pump circuit 906 comprises transistor switches 900_M2, 906_M1, 906_M2 and a flying capacitor unit C4, wherein a source of the transistor switch 906_M1 receives the conduction voltage source VDD, a terminal of the flying capacitor unit C4 is coupled to the drain of the transistor switch 900_M2 and the source of the transistor switch 900_M3, another terminal of the flying capacitor unit C4 is coupled to a drain of the transistor switch 906_M1 and a drain of the transistor switch 906_M2, and a source of the transistor switch 906_M2 is coupled to the ground. Drains of the transistor switches 900_M2, 900_M3, and 900_M4 are coupled to sources of the transistor switches 900_M3, 900_M4, and 900_M5, respectively.

Further, the fifth charging pump circuit 908 comprises transistor switches 900_M1, 908_M1-908_M4 and a flying capacitor unit C5, wherein the transistor switch 908_M1, 908_M2 and the flying capacitor unit C5 are connected in series to form a first circuit branch, i.e. a drain of the transistor switch 908_M1 is coupled to a source of the transistor switch 908_M2, a drain of the transistor switch 908_M2 is coupled to a terminal of the flying capacitor unit C5. The transistor switch 908_M3 is formed as a second circuit branch, i.e. a source of the transistor switch 908_M3 receives the conduction voltage source VDD, and the first circuit branch and the second circuit branch are connected in parallel to a drain of the transistor switch 908_M4, i.e. another terminal of the flying capacitor unit C2, a drain of the transistor switch 908_M3 and the drain of the transistor switch 908_M4 are connected together, and a source of the transistor switch 908_M4 is coupled to the ground. Besides, the source of the transistor switch 900_M1, the source of the transistor switch 908_M1 and a terminal of the storage capacitor unit Cs are connected together, and the drain of the transistor switch 900_M1 is coupled to the drain of the transistor switch 908_M1. A drain of the transistor switch 900_M1 is coupled to the source of the transistor switch 900_M2.

Accordingly, in the embodiment, the charging pump module 90 can utilize the conduction signals KA, KB, XA, XB, KA6, KB6, XA6 (i.e. an inversion signal of KA6), XB6 (i.e. an inversion signal of KB6), EN6, XEN6 (i.e. an inversion signal of EN6), to adaptively conduct the transistor switches 900_M1-900_M8, 902_M1-902_M2, 904_M1-904_M2, 906_M1-906_M2, 908_M1-908_M4 i.e. gates of the 900_M1, 900_M2, 900_M3, 900_M4, 900_M5, 900_M6, 900_M7, 900_M8, 902_M1, 902_M2, 904_M1, 904_M2, 906_M1, 906_M2, 908_M1, 908_M2, 908_M3, 908_M4 receive the conduction signals XB6, XA, XB, XA, XB, XA, XB, KA, XA, KB, XB, KA, XA, KB, EN6, XEN6, XB6, KA6, respectively. Accordingly, the charging pump module 90 can conduct the flying capacitor units C1-C5, respectively, in the operational periods t1, t2 according to the waveforms of the conduction signals shown in FIG. 9B, to output different values of the adjustment charging value, e.g. the charging pump module 90 can selectively output the adjustment charging value as 5 times or 6 times. For example, the flying capacitor unit C1 is serially connected to the flying capacitor units C2-C5 when a first voltage boost factor (6 times) is selected, the flying capacitor unit C5 is disconnected from the flying capacitor unit C1-C4 when a second voltage boost factor (5 times) is selected.

Certainly, the number of the charging pump circuits, the transistor switches and the flying capacitor units shown in FIG. 8A and FIG. 9A are only demonstrated for illustrations, and those skilled in the art can adaptively modify or adjust the utilization number and/or the connection relationship of the charging pump circuit, the transistor switch and the flying capacitor unit, such that the charging pump module can adaptively output different values of the adjustment charging value, and the power supply system is not necessary to consume more power for achieving the predetermined voltage within the shortest period, which is also within the scope of the invention.

In comparison with the prior art which only provides the charging pump module with a fixed value of the adjustment charging value, the embodiments of the invention can utilize different combinations of the switch modules, the switch modules and multiple charging pump modules to provide different values of the adjustment charging value, such that the power supply system can be rapidly charged to the predetermined voltage for driving the display apparatus. In the meanwhile, for complying with different resolutions corresponding to different driving periods of the multiple driving units in the display panel, those skilled in the art can also utilize the above embodiments to adaptively combine the charging pump modules with different values of the adjustment charging value, so as to process an adjustment operation of the adjustment charging value in the charging period via the stairway adjustment, which is also within the scope of the invention.

To sum up, the embodiments of the invention provide the charging pump module comprising at least one charging pump module and utilize the control module to adaptively conduct the flying capacitor units in the charging pump module for outputting different values of the adjustment charging values, so as to shortening the charging period of the power supply system driving an electronic device (e.g. the display apparatus). In the meanwhile, the control module of the embodiments can monitor the changes of the amplifying voltage to adaptively output the control signal for adjusting values of the adjustment charging value. Certainly, if the power supply system comprises a plurality of charging pump modules, the switch module of the embodiments can be operated to switch the connection of the plurality of charging pump modules for outputting different values of the adjustment charging value, such that the power supply system of the embodiments not only can utilize the minimum power for the charging operation but also can shorten the charging period for the electronic device (e.g. the display apparatus), so as to broaden the application range of the charging pump module and the electronic apparatus thereof.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power supply system, comprising:
   a control module for generating a control signal;
   a first charging pump module, coupled to the control module, comprising:
      a first charging pump circuit comprising a first flying capacitor unit; and a second charging pump circuit comprising a second flying capacitor unit and a first transistor switch coupled between the first flying capacitor unit and the second flying capacitor unit for selecting one of a first voltage boost factor and a second voltage boost factor according to the control signal, wherein the first flying capacitor unit is serially connected to the second flying capacitor unit when the first voltage boost factor is selected, the second flying capacitor unit is disconnected from the first flying capacitor unit when the second voltage boost factor is selected, and the first charging pump module outputs a charging voltage according to the one of the first voltage boost factor and the second voltage boost factor and a conduction voltage source;

an amplifying module, coupled to the first charging pump module, for utilizing the charging voltage as a voltage source to generate an amplifying voltage; and a load module, coupled to the amplifying module, for processing a dynamic charging operation according to the amplifying voltage.

2. The power supply system of claim 1, wherein the control signal generated by the control module is utilized to turn on or turn off the second flying capacitor unit, so as to generate the first voltage boost factor and the second voltage boost factor.

3. The power supply system of claim 1, wherein the control module is further coupled to the amplifying module to receive a reference voltage and the amplifying voltage, such that the control module correspondingly outputs the control signal to turn on or turn off the second flying capacitor unit according to a difference between the reference voltage and the amplifying voltage, so as to generate the first voltage boost factor and the second voltage boost factor.

4. The power supply system of claim 1, wherein the dynamic charging operation is operated to output an initiation adjustment charging value when the amplifying voltage is smaller than a predetermined voltage, and is operated to output a termination adjustment charging value when the amplifying voltage is larger than the predetermined voltage, and the initiation adjustment charging value is larger than the termination adjustment charging value.

5. The power supply system of claim 1, further comprising a second charging pump module and a switch module, wherein the switch module is coupled to the first charging pump module, the second charging pump module, the control module and the amplifying module, and the first charging pump module corresponds to a first adjustment charging value and the second charging pump module corresponds to a second adjustment charging value, such that the switch module is operated to switch the first charging pump module or the second charging pump module to be connected to the amplifying module according to the control signal, so as to utilize the first adjustment charging value or the second adjustment charging value for generating the amplifying voltage to be transmitted to the amplifying module.

6. The power supply system of claim 1, wherein the first charging pump module further comprises:

a plurality of charging pump circuits, each charging pump circuit comprises a plurality of transistor switches and a flying capacitor unit;

wherein the control module is coupled to a plurality of flying capacitor units of the plurality of charging pump circuits, to utilize the control signal for turning on or turning off the plurality of flying capacitor units, so as to generate the first voltage boost factor and the second voltage boost factor, such that the first charging pump module outputs the charging voltage to be transmitted to the amplifying module.

7. A display apparatus, comprising:

a display panel; and a power supply system, coupled to the display panel, the power supply system comprising:

a first charging pump module, coupled to the control module, comprising:

a first charging pump circuit comprising a first flying capacitor unit; and a second charging pump circuit comprising a second flying capacitor unit and a first transistor switch coupled between the first flying capacitor unit and the second flying capacitor unit for selecting one of a first voltage boost factor and a second voltage boost factor according to the control signal, wherein the first flying capacitor unit is serially connected to the second flying capacitor unit when the first voltage boost factor is selected, the second flying capacitor unit is disconnected from the first flying capacitor unit when the second voltage boost factor is selected, and the first charging pump module outputs a charging voltage according to the one of the first voltage boost factor and the second voltage boost factor and a conduction voltage source;

an amplifying module, coupled to the first charging pump module, for utilizing the charging voltage as a voltage source to generate an amplifying voltage; and a load module, coupled to the amplifying module, for processing a dynamic charging operation according to the amplifying voltage, to drive a display operation of the display panel.

8. The power supply system of claim 1, wherein the first charging pump module further comprises a third charging pump circuit comprising:

a third flying capacitor unit; and a second transistor switch coupled to the first, second and third flying capacitor units;

wherein the first flying capacitor unit is serially connected to the second and third flying capacitor units and the second and third flying capacitor units are paralleled connected when the first voltage boost factor is selected, the second flying capacitor unit is disconnected from the first and second flying capacitor units when the second voltage boost factor is selected;

wherein the control module is coupled to the third flying capacitor unit, to utilize the control signal for turning on or turning off the third flying capacitor unit, so as to generate the first voltage boost factor and the second voltage boost factor, such that the first charging pump module outputs the charging voltage to be transmitted to the amplifying module.

9. The display apparatus of claim 7, wherein the first charging pump module further comprises a third charging pump circuit comprising:

a third flying capacitor unit; and a second transistor switch coupled to the first, second and third flying capacitor units;

wherein the first flying capacitor unit is serially connected to the second and third flying capacitor units and the second and third flying capacitor units are paralleled connected when the first voltage boost factor is selected, the second flying capacitor unit is disconnected from the first and second flying capacitor units when the second voltage boost factor is selected;

wherein the control module is coupled to the third flying capacitor unit, to utilize the control signal for turning on or turning off the third flying capacitor unit, so as to generate the first voltage boost factor and the second voltage boost factor, such that the first charging pump module outputs the charging voltage to be transmitted to the amplifying module.

* * * * *